US006727906B2

(12) United States Patent
Lockeridge et al.

(10) Patent No.: US 6,727,906 B2
(45) Date of Patent: *Apr. 27, 2004

(54) METHODS AND APPARATUS FOR GENERATING IMAGES

(75) Inventors: Catherine Jane Lockeridge, Engadine (AU); Stephen Robert Bruce, Abbottsford (AU); Richard Lam, Waterloo (AU); Bernard John Giannetti, Middle Cove (AU)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/143,430

(22) Filed: Aug. 28, 1998

(65) Prior Publication Data

US 2002/0012003 A1 Jan. 31, 2002

(30) Foreign Application Priority Data

Aug. 29, 1997 (AU) .............................................. PO8861
Aug. 29, 1997 (AU) .............................................. PO8862

(51) Int. Cl.[7] .............................................. G06T 11/00
(52) U.S. Cl. .................................................... 345/581
(58) Field of Search ................................. 345/354, 961, 345/974, 431, 429, 199, 145, 147, 157, 156, 467, 432, 442, 468, 441, 169, 469, 328, 389, 581, 601, 593; 434/81, 84, 88; 206/1.8, 575; 382/162

(56) References Cited

U.S. PATENT DOCUMENTS 4,416,632 A * 11/1983 Berman ........................ 434/84
5,432,896 A * 7/1995 Hwong et al. ................ 345/429
5,828,819 A * 10/1998 Do .............................. 345/431
5,844,565 A * 12/1998 Mizutani et al. ............. 345/429
5,966,134 A * 10/1999 Arias .......................... 345/589

FOREIGN PATENT DOCUMENTS

EP          0702332       3/1996    .......... G06T/15/50
JP          8-185531      7/1996    .......... G06F/15/72

OTHER PUBLICATIONS

Haeberli, Paint by Numbers: Abstract Image Representations, ACM, 1990, pp. 207–214.*

Strong III et al., A Region Color Technique for Scene Analysis, Communications of the ACM, Apr. 1973, vol. 16, No. 4, pp. 237–246.*

Salisbury et al., Interactive Pen–and–Ink Illustration, ACM, 1997.*

Curtis et al., Computer–Generated Watercolor, ACM, 1997.*

* cited by examiner

Primary Examiner—Jeffery Brier
Assistant Examiner—Motilewa Good-Johnson
(74) Attorney, Agent, or Firm—Fitzpatrick, Cella, Harper & Scinto

(57) ABSTRACT

A method of automatically transforming an arbitrary pixel image into a corresponding simulated water color like image is disclosed. The method includes dividing the image into regions (630) having substantially the same color characteristics (632). Once divided, the borders (734, 735) of the regions are determined and filtered. The filtering utilizes the color of the regions on each side of the border to produce a mixture color along the border.

9 Claims, 11 Drawing Sheets

METHODS AND APPARATUS FOR GENERATING IMAGES

FIELD OF INVENTION

The present invention relates to method(s) and apparatus(es) for producing images. In particular, the invention relates to a method and apparatus for automatically transforming an arbitrary pixel image into a corresponding simulated watercolor like image. The invention also relates to a method and apparatus for automatically creating a paint by number image from an arbitrary image. The invention further relates to a computer program product including a computer readable medium having recorded thereon a computer program for automatically transforming an arbitrary pixel image into a corresponding simulated water color like image. In addition, the invention also relates to a computer program product including a computer readable medium having recorded thereon a computer program for automatically creating a paint by number image from an arbitrary image.

BACKGROUND

Paint-by-number systems are known in the art. In one particular example, a paint-by-number image includes a printed image having a plurality of numbered outlined regions and a separate numbered color index. A user paints the numbered regions according to the number in the region and the color index. These printed paint-by-number images are marketed particularly for use by children and teenagers. However, the paint-by-number systems have the significant disadvantage that the regions for coloring must often be manufactured by hand in a specialized manner. Unfortunately, this limits and restricts the variability of the images that can be utilized for a paint-by-number system, which in turn limits the acceptance, and flexibility of such paint-by-number systems.

It has also become popular for computer graphics design packages to include various filters for the production of effects based on an initial image. Packages such as Adobe's Photoshop (Trade Mark) and Kai's Power Tools (Trade Mark) are able to substantially automatically produce various filtering effects which result in aesthetically appealing images being produced from an arbitrary initial input image created images. It is desirable to produce an automated "watercolor" effect in an image wherein an arbitrary image is taken and processed so as to produce a corresponding image that has the aesthetic quality that it appears to have been produced by means of utilization of watercolors to paint the same scene as that imaged by the initial image. However, prior art computer graphics packages have the disadvantage of not being able to produce an automated "watercolor" effect.

SUMMARY OF INVENTION

It is an object of the present invention to ameliorate one or more disadvantages of the prior art.

According to one aspect of the invention there is provided a method of automatically transforming an arbitrary pixel image into a corresponding simulated water color like image, said method including the steps of: dividing the image into regions having substantially the same color characteristics; determining borders of said regions and filtering said borders wherein said filtering utilizes the color of the regions on each side of said border to produce a mixture color along the border.

According to another aspect of the invention there is provided a method of automatically creating a paint by number image from an arbitrary image, said method including the steps of: creating a series of regions of said arbitrary image, each said region having substantially the same color; grouping the regions into color planes of substantially the same color; minimizing the number of color planes below a predetermined number of planes; and determining borders of said regions and outputting the borders together with at least an index indicating the color plane of each region in the form of a color by number image having characteristics of the original arbitrary image.

According to still another aspect of the invention there is provided an apparatus for automatically transforming an arbitrary pixel image into a corresponding simulated water color like image, said apparatus including: means for dividing the image into regions having substantially the same color characteristics; and means for determining borders of said regions and filtering said borders wherein said filtering utilizes the color of the regions on each side of said border to produce a mixture color along the border.

According to still another aspect of the invention there is provided an apparatus for automatically creating a paint by number image from an arbitrary image, said apparatus including: means for creating a series of regions of said arbitrary image, each said region having substantially the same color; means for grouping the regions into color planes of substantially the same color; means for minimizing the number of color planes below a predetermined number of planes; and means for determining borders of said regions and outputting the borders together with at least an index indicating the color plane of each region in the form of a color by number image having characteristics of the original arbitrary image.

According to still another aspect of the invention there is provided a computer program product including a computer readable medium having recorded thereon a computer program for automatically transforming an arbitrary pixel image into a corresponding simulated water color like image, said computer program product including: means for dividing the image into regions having substantially the same color characteristics; means for determining borders of said regions and filtering said borders wherein said filtering utilizes the color of the regions on each side of said border to produce a mixture color along the border.

According to still another aspect of the invention there is provided a computer program product including a computer readable medium having recorded thereon a computer program for automatically creating a paint by number image from an arbitrary image, said computer program product including: means for creating a series of regions of said arbitrary image, each said region having substantially the same color; means for grouping the regions into color planes of substantially the same color; means for minimizing the number of color planes below a predetermined number of planes; and means for determining borders of said regions and outputting the borders together with at least an index indicating the color plane of each region in the form of a color by number image having characteristics of the original arbitrary image.

BRIEF DESCRIPTION OF THE DRAWINGS

Embodiments of the invention are described with reference to the drawings, in which.

DETAILED DESCRIPTION

Figure 1A:
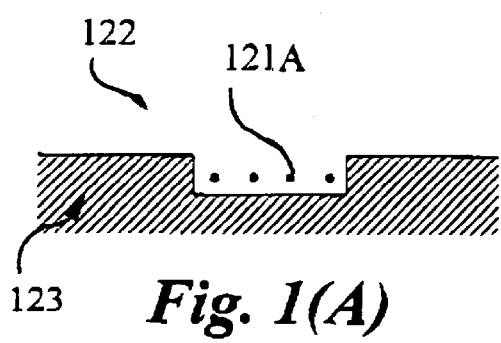
FIGS. 1(A)–(H) illustrate various applicable rules for filling in holes.
Figure 1B:
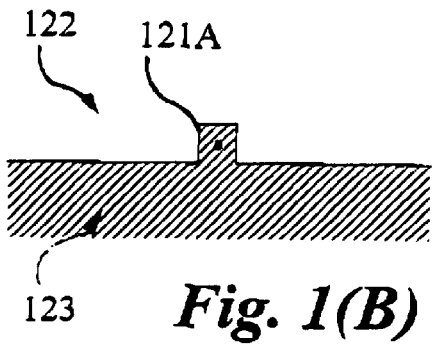
Figure 1C:
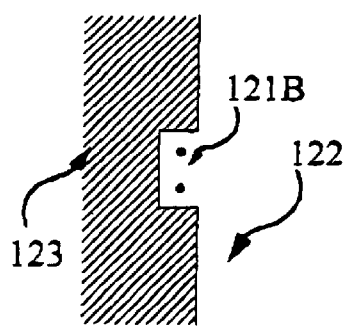
Figure 1D:
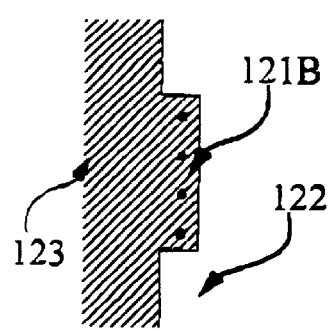
Figure 1E:
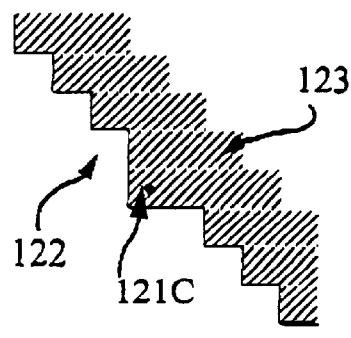
Figure 1F:
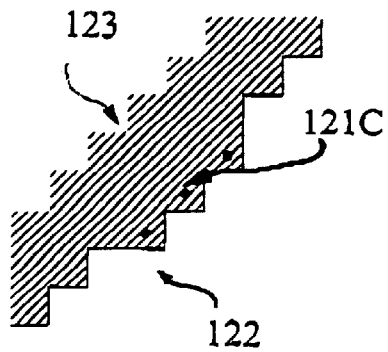
Figure 1G:
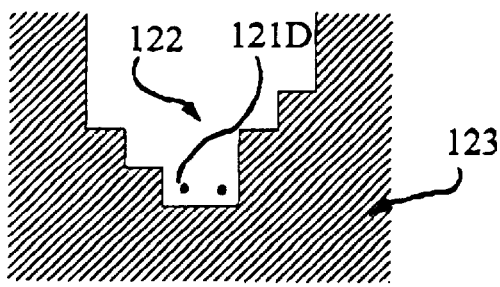
Figure 1H:
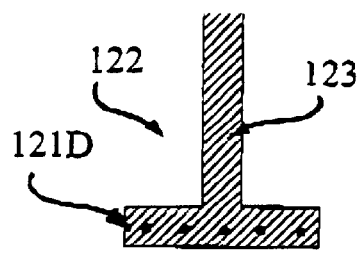
Figure 2A:
FIGS. 2(A)–(D) illustrate various applicable rules for filling in holes.
Figure 2B:
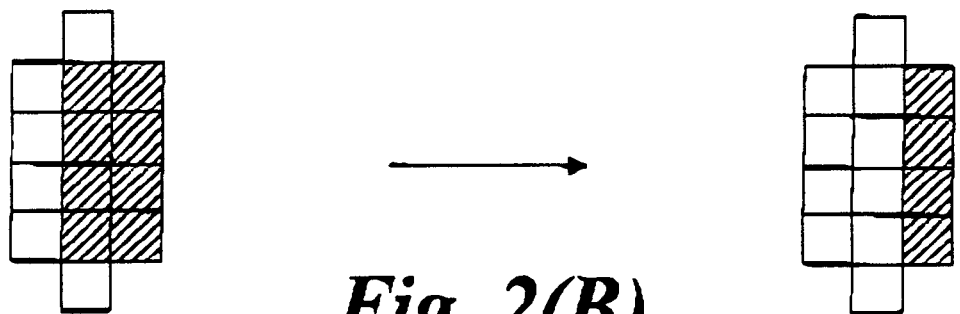
Figure 2C:
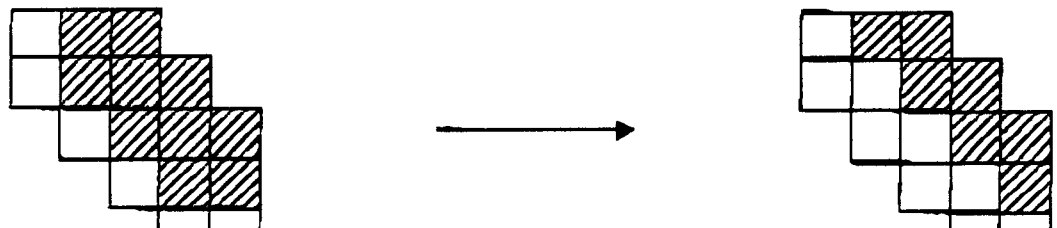
Figure 2D:
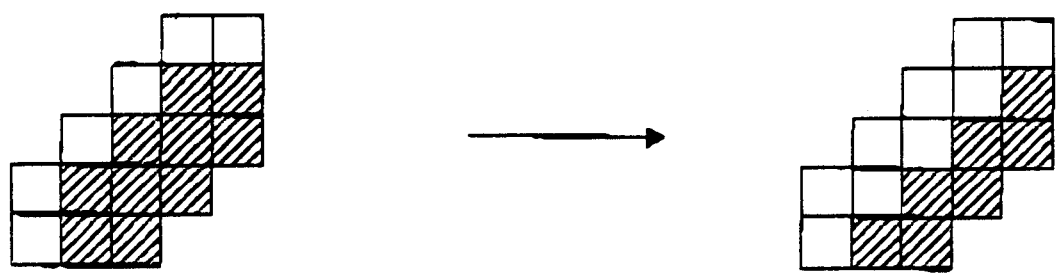

Where reference is made in any one or more of the drawings to steps and/or features, which have the same reference numerals, those steps and/or features are for the purposes of this description the same.

For the purposes of the preferred embodiments, it will be assumed that the input data used by the preferred methods include a collection of pixels corresponding to an image, each having separate color information for Red, Green, and Blue color portions of a particular pixel as is common standard image format. However, it is not intended that the present invention be limited to any particular color model. Other color models can be envisaged, such as CYMK or any monochrome color model.

Before proceeding with a description of the embodiments, a brief review of terminology used hereinafter is provided. A "region" preferably includes a four-connected (4-connected) group of pixels. By four-connected, it is meant that if the pixels are arranged in a grid in which each pixel is represented by a square with four sides, then two pixels are four-connected if they share a common side.

A more formal definition of a region is a set of pixels, S, such that for every pair of pixels $a \in S$, $b \in S$, there exist a vector of pixels of the form (p1, p2, . . . , pn), p1=a, and p2=b, where n is an integer, n>0, and $$\forall i \in \{1,2, \ldots ,n\}, p_i \in S, \text{ and } \forall i \in \{1,2, \ldots ,n-1\} p_i \text{ and } p_{i+1} \text{ are four connected.} \quad (EQ\ 1)$$

A "plane" is defined by a set of regions all of the same color.

First Embodiment

Figure 8:
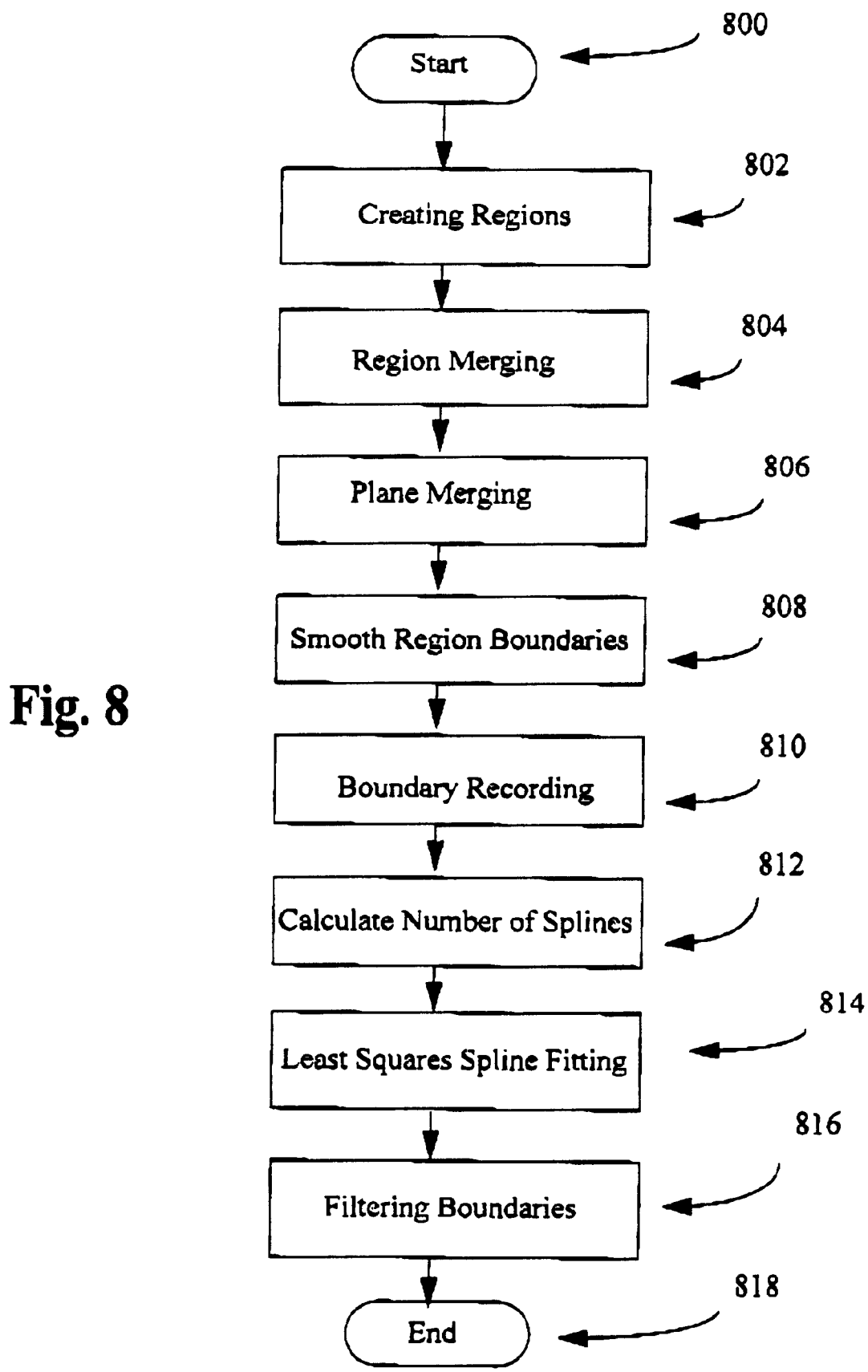
FIG. 8 illustrates a flow chart of a preferred method for automatically transforming an arbitrary pixel image into a corresponding simulated watercolor like image.

FIG. 8 illustrates a flow chart of a preferred method for automatically transforming an arbitrary pixel image into a corresponding simulated watercolor like image. In this preferred embodiment, a watercolor effect is produced from an arbitrary pixel image by utilizing a number of processing steps. The steps can be divided into two main categories, the first category 802 to 814 being the conversion of the initial image into a "faceted" image, which includes regions primarily formed of one color. The second category 900, which produces an enhanced water color effect, is to blur the image along the boundaries of the regions produced by the first step.

Dealing first with the creation of a series of smoothly shaped regions from an initial pixel image, there will now be described one form of processing of an arbitrary pixel image so as to produce a corresponding list of spline data points which define regions having similar color characteristics.

In step 800 of the preferred method, the process commences and the arbitrary image is inputted and any necessary parameters are initialized. After completion, the processing continues at step 802.

Step 802: Region Growing

In step 802, the region creation and growing process proceeds as follows. Initially, all pixels are unowned, and an unowned pixel is located and designated as a new single pixel region. This pixel is known as the seed of the region. The perimeter of the region is then searched for pixels which are also unowned, that are 4-connected to the region, and are within a predetermined threshold in color-difference from the color of the seed of the region. When such a pixel is found, it is added to the region and a search is conducted for another such pixel. When no such pixels remain, growing of the region is terminated. A new unowned pixel is then selected, and a new region growing process is started. When no more regions can be started, because there are no more unowned pixels in the image, region growing is terminated. All the created regions are then assigned a color, which is the average color of pixels in the region. After completion, processing continues at step 804.

Step 804: Region Merging

Once a collection of regions has been created, a process of region merging is carried out where the number of regions is reduced below a predetermined number. In step 804, regions are selected to be eliminated by merging into a selected other region. The other region must be adjacent (4-connected) to the or each region being eliminated. When a region is eliminated, it is merged into the adjacent region that is closest in color. The color of the new region is the average of the colors of the old regions, weighted proportionally by the numbers of pixels in the old regions.

First, all regions containing only one or two pixels are eliminated, then the regions are eliminated in order of increasing "cost". The cost of eliminating a region is determined by a predefined heuristic function. A suitably defined heuristic is one that takes into account the number of pixels in a region and the color difference between the region and the nearest-colored adjacent region. Once such calculation is as follows:

$$\text{cost}=sqrt(num\_\text{pixels})*log(num\_\text{pixels})*\text{color\_difference} \quad (EQ\ 2)$$

When the number of regions is equal to the predetermined number, the region merging process is stopped and processing continues at step 806.

Step 806: Plane Merging

In step 806, a process of plane merging is undertaken. In this process, the number of planes is reduced to a predetermined number, which, for example, can correspond to the number of entries in a color index table to be created with the final paint by number image. Initially, each region is a plane. Planes are selected to be eliminated by merging into a selected other plane. The other plane is not required to be adjacent in any way to the plane being eliminated. When a plane is eliminated, it is merged into the plane, which is closest in color. The color of the new plane is the average of the colors of the old planes, weighted proportionally by the numbers of pixels in the old planes.

Planes are eliminated in order of increasing "cost". The cost of eliminating a plane is a predetermined heuristic being, for example, the color difference between a first plane and the nearest-colors second plane.

When the number of planes is equal to the predetermined number of color entries in a final color index table, the plane merging process is stopped.

Step 808: Smoothing

At this stage, the borders between the various regions are typically very complex, often containing many branching peninsulas of one or two pixels width. This is the result of applying a sharp threshold in the region growing process. In this step 808, the borders are then simplified using a pixel-based smoothing process. A preferred process for smoothing the borders of the region can be described as "filling in the holes", where a hole is a one-pixel-deep indentation in a border between two regions.

Turning now to the drawings, FIG. 1 shows a number of examples of region boundaries each with various candidate holes 121 which are marked with dots, between a first region 122 and a second region 123. FIGS. 1(A) and 1(B) are each examples of horizontal holes 121A. FIGS. 1(C) and 1(D) are each examples of vertical holes 121B. FIGS. 1(E) and 1(F) are each examples of diagonal holes 121C, whilst FIGS. 1(G) and 1(H) show examples of other types of holes 121D.

Filling in a hole means changing the ownership of pixels in the hole to that of the other region. A hole is only filled in, if filling it in would not change the color of any pixels in the hole beyond a predetermined color-distance of the color of that pixel in the original image.

In addition, a hole is also only filled-in, if doing so would not split a region in two. This is ensured by using a number of pixel transformation rules for filling in holes such as those shown in FIGS. 2(A)–(D), in which a relative continuity between the borders of the region can be maintained.

Figures 3A, 3B, 3C, 3D, 3E, 3F:
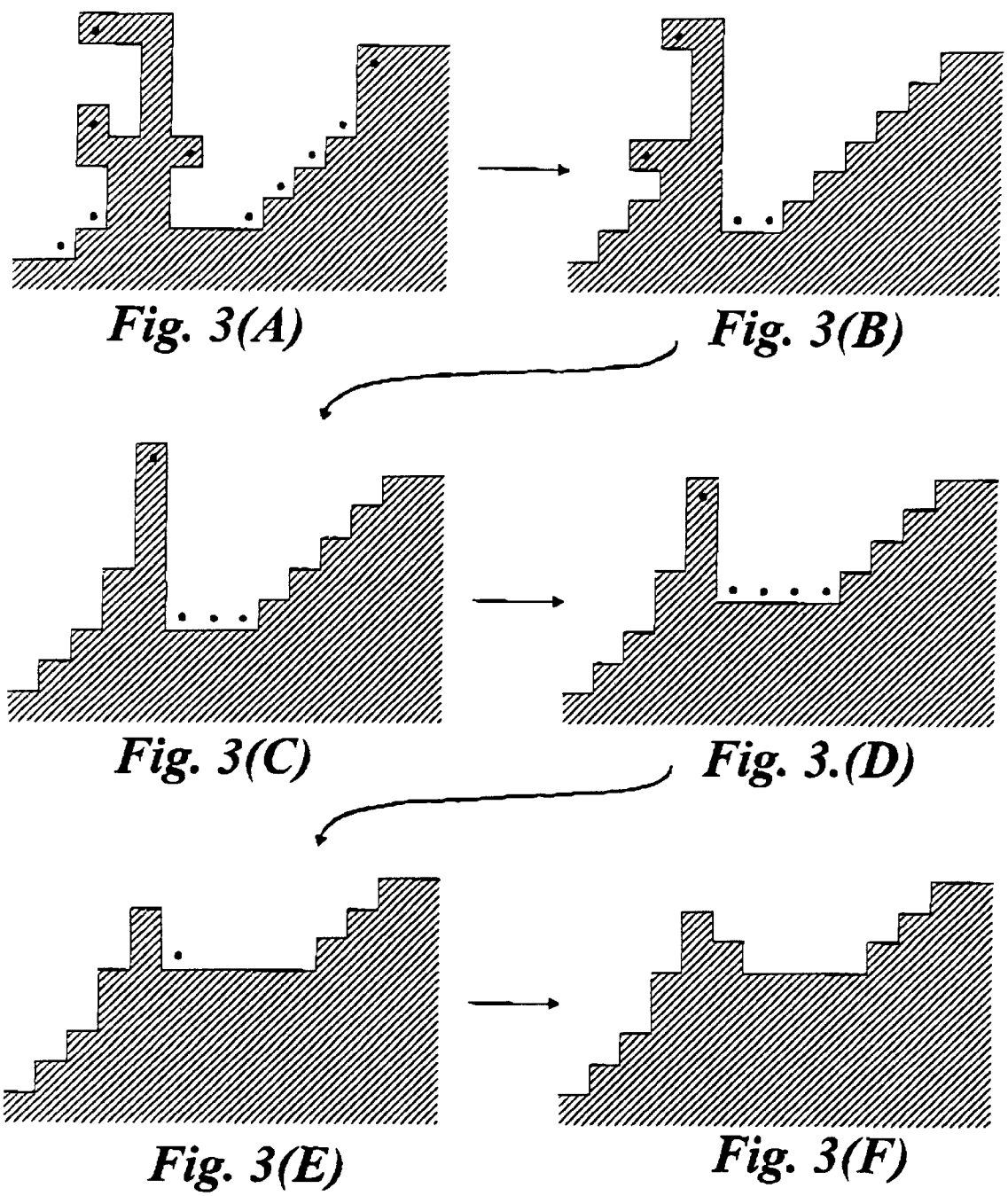
FIG. 3 illustrates an example of one process for filling in holes.
Figure 4A:
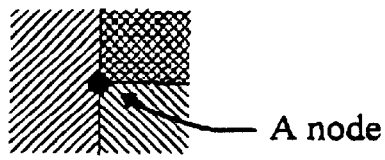
FIGS. 4(A)–(D) illustrate various examples for determination of nodes on the boundaries of a region.
Figure 4B:
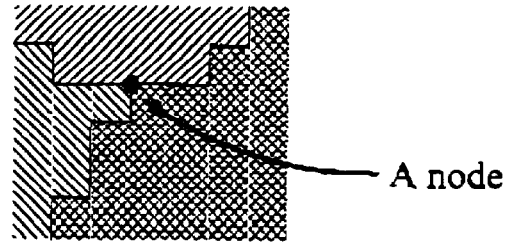
Figure 4C:
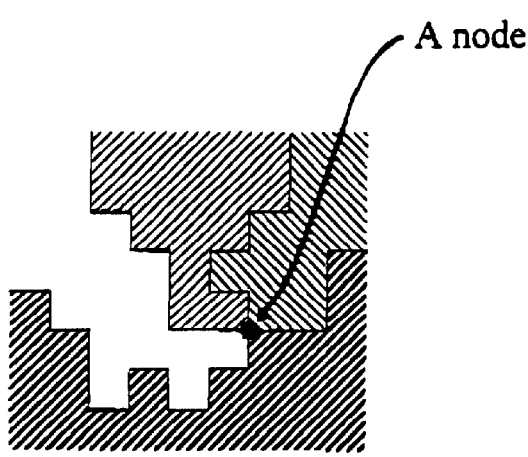
Figure 4D:
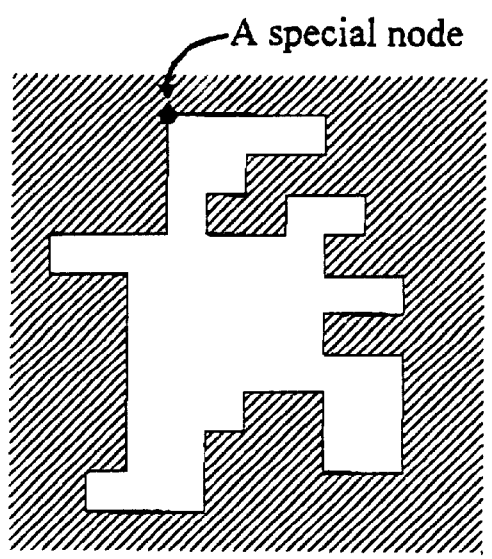

Referring now to FIG. 3, there is shown an arbitrary example of operation of the smoothing method which can be implemented by repeatedly passing through the image in the scanline-order, filling in holes, until there are no more holes that may be filled in. After the completion of this step, the processing passes to step 810.

Step 810: Boundary Recording

In step 810, an exterior region is then added as a new region, by adding a single-pixel wide border to the image. The exterior region exists as a special region and is not actually drawn. It exists merely to simplify operation of the following stages.

The image is now made up of regions. Each region has an outer boundary and zero or more inner boundaries, apart from the special exterior region, which is defined only to have one inner boundary. When fitting splines to region boundaries, to facilitate graphic object-based rendering, it is required that the same splines are fitted to both "sides" of the boundary. That is, along the border of adjoining regions A and B, there must be no overlap and no empty space between the splines used to define the two regions.

Referring now to FIGS. 4(A)–(D), to ensure that no overlap or empty space exists, the region boundaries are searched for a collection of "nodes". A node is a point on the corner of a pixel where three or four regions meet, or is a "special node". A "special node" is a pixel-corner chosen on the boundary of two regions which have no other nodes on that boundary (i.e, the outer boundary of one region is an inner boundary of another). There are no nodes on the outside of the exterior region. Splines can then be fitted to the sections of region-border between pairs of nodes, and can then be used for the boundaries of both regions.

For each node, a node adjacency list is recorded by making a list of the adjacent nodes, being nodes that are reached by following a region border out from the node in a clockwise order when exiting the node. It should be noted that it is possible for there to exist a node which returns to itself (comes back to the same node). In fact, this is always the case for special nodes, hence some nodes are adjacent to themselves.

For each region, a boundary measure is then recorded by making a list of boundaries. Each boundary is recorded simply as a pointer to a node and a direction (North, South, East or West) out of the node such that the region will be on the right when existing the node. The special case of the exterior region has only one boundary, which is an inner boundary.

For each region, a boundary sort is performed by determining which boundary is the outer boundary and the outer boundary is moved to the front of the boundary list for that region. The exterior region has no outer boundary and hence is not sorted.

Step 812: Spline Number Calculation

In the next step 812, each section of a region boundary between two nodes is analyzed by following along the section and the coordinates of all the pixel corners are recorded. This gives an array of points, with each point being one pixel distant from the next point in the array in a North, South, East or West direction.

A predetermined desired length of an array of points is used to analyze the array. If an array is more than 1.5 times the desired length, it is split up into several smaller arrays, each near as possible to the desired length.

The number of Bezier splines required to fit to each array is calculated by making a copy of the array and filtering the copy twice with a low-pass filter, such as a box filter of three point's width. For each point in the copy, the curvature is measured as the signed magnitude of the cross product of the unit vectors from the last point to a current point and from the current point to the next point.

The number of places where the curvature changes sign are counted. A change in curvature sign is only registered if the curvature passes zero by a certain predetermined threshold.

The number of Bezier splines is then taken to be (0.75* (curvature_changes+1)).

Each array of points is passed to a spline filter along with the number of Beziers to fit. After the region boundaries have been processed into discrete chains of pixels, the method continues at step 814.

Step 814: Least Squares Spline Fitting

In step 814, a smooth spline curve is calculated for each of these chains such that the curve is influenced by the given data points, but is not restricted to pass through all the given points, save the first and last data points. This is achieved by applying a mathematical technique known as least squares.

The least squares techniques applied here is somewhat more advanced than that found in contemporary text books due to the fact that the underlying mathematics used is based on non-uniform non-rational B-splines. The benefit of using this mathematics comes from the fact that the B-spline basis is more robust than the more traditional polynomial approach. More importantly it allows complete freedom in dealing with arbitrarily shaped geometry. The least squares B-spline technique is described below.

Given p data points, it is necessary to determine a set of n control vertices that minimize the distance between the cubic B-spline curve they define, and the data points.

The equation of a 4th order B-spline curve is given by:

$$C(u) = \sum_{j=0}^{n-1} \underline{v}_j B_{j4}(u) \quad (EQ\ 3)$$

where the position of the jth control vertex is represented by:

$$\underline{v}_j = \begin{bmatrix} X_j \\ Y_j \end{bmatrix} \quad (EQ\ 4)$$

It is therefore required to minimize the following expression.

$$\underline{S} = \sum_{k=0}^{n-1} (\underline{C}(u_k) - \underline{x}_k)^2 \quad 4 \le n \le p \quad (EQ\ 5)$$

where the kth data point is represented by:

$$\underline{x}_k = \begin{bmatrix} x_k \\ y_k \end{bmatrix} \quad (EQ\ 6)$$

Figure 5:
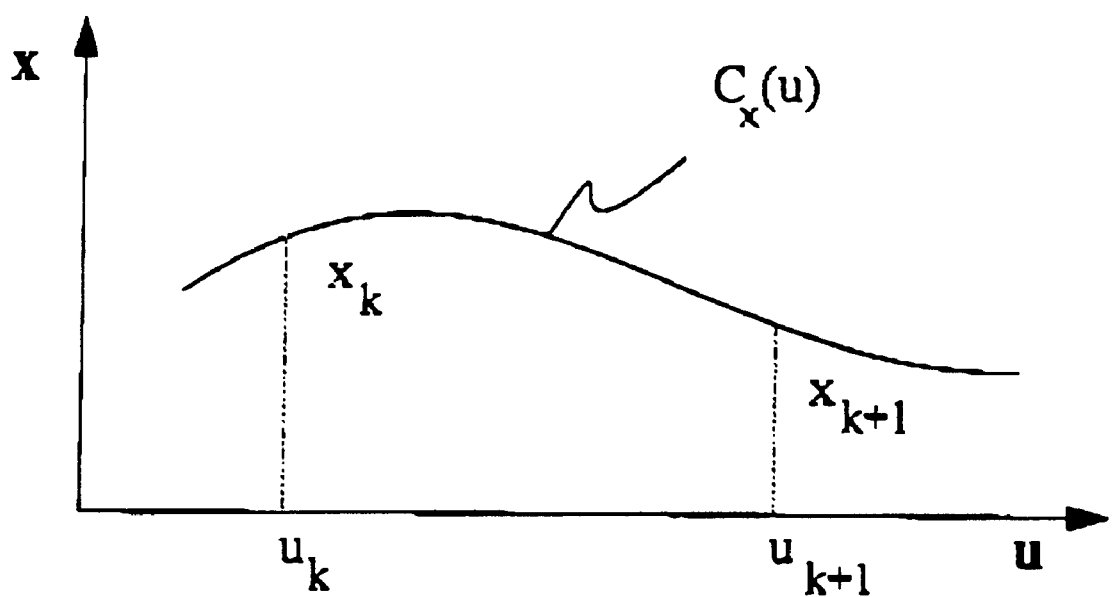
FIG. 5 shows a process of a least squares fit of piecewise Bezier splines.

With reference to FIG. 5, there is shown a standard B-spline arrangement where it is assumed that the X and Y domains will be treated analogously. Consequently, only the X domain is shown in FIG. 5 and considered in the following description. In order to determine the least squares fit, the expression to be minimized becomes:

$$S_x = \sum_{k=0}^{p-1} \left[ \sum_{j=0}^{n-1} X_j B_{j4}(u_k) - x_k \right]^2 \quad (EQ\ 7)$$

To minimize this expression, the partial derivatives are computed and set to zero as follows:

$$\frac{ds_x}{dx_i} = 2 \sum_{k=0}^{p-1} \left[ \sum_{j=0}^{n-1} X_j B_{j4}(u_k) - x_k \right] B_{i4}(u_k) = 0 \quad i = 0 \text{ to } n-1. \quad (EQ\ 8)$$

This equation can be simplified as follows:

$$\sum_{k=0}^{p-1} \sum_{j=0}^{n-1} X_j B_{j4}(u_k) B_{i4}(u_k) = \sum_{k=0}^{p-1} x_k B_{i4}(u_k) \quad (EQ\ 9)$$

$$\sum_{j=0}^{n-1} \left[ \sum_{k=0}^{p-1} B_{j4}(u_4) B_{i4}(u_k) \right] X_j = \sum_{k=0}^{p-1} x_k B_{i4}(u_k)$$

Applying this to each Xi, there is produced a set of n simultaneous equations in n unknowns which can be solved by any of the standard techniques such as Gaussian elimination.

For this application however, it is important that the resultant spline curve interpolate the first and last data point. This is achieved by setting the first and last control points to the known data points and removing them from the system to leave n−1 equations in n−1 unknowns, and solving for this system.

This results in the following expression for each Xi:

$$\sum_{j=1}^{n-2} \left[ \sum_{k=0}^{p-1} B_{j4}(u_k) B_{i4}(u_k) \right] X_j = \quad (EQ\ 10)$$

$$\sum_{k=0}^{p-1} x_k B_{i4}(u_k) - \sum_{k=0}^{p-1} B_{04}(u_k) B_{i4}(u_k) x_o - \sum_{k=0}^{p-1} B_{n-1}(u_k) B_{i4}(u_k) x_p$$

Thus, given an open pixel chain and an estimation of the number of cubic spline curves required (q,v), a non-uniform non-rational B-spline curve is calculated that approximates the form of the pixel chain. This is then converted to a set of Bezier curves and stored with the pixel chain. Once all chains have been processed, the resulting Bezier splines for each region can be output, together with color information. Step 816. Boundary Filtering The output of the previous step 814 includes interconnected splines denoting regions having a substantially uniform color. The next step 816 scales the upward splines in accordance with output image size requirements and then creates a corresponding pixel based image having regions of pixels of substantially the same color.

Next, for each region in the image, the spline list denoting its outside border is traversed and a blur or filter applied to each pixel encountered along the spline border. The blur can include an averaging filter such as a Gaussian filter. The resulting effect of applying the blur filter is to produce a more realistic image closely approximating a watercolor effect. Alternatively, a motion blur filter can be applied to each region to thereby produce a "weeping" effect.

Further, in the alternative, the blur can be applied per region so as to produce a brush stroking effect.

Figure 7:
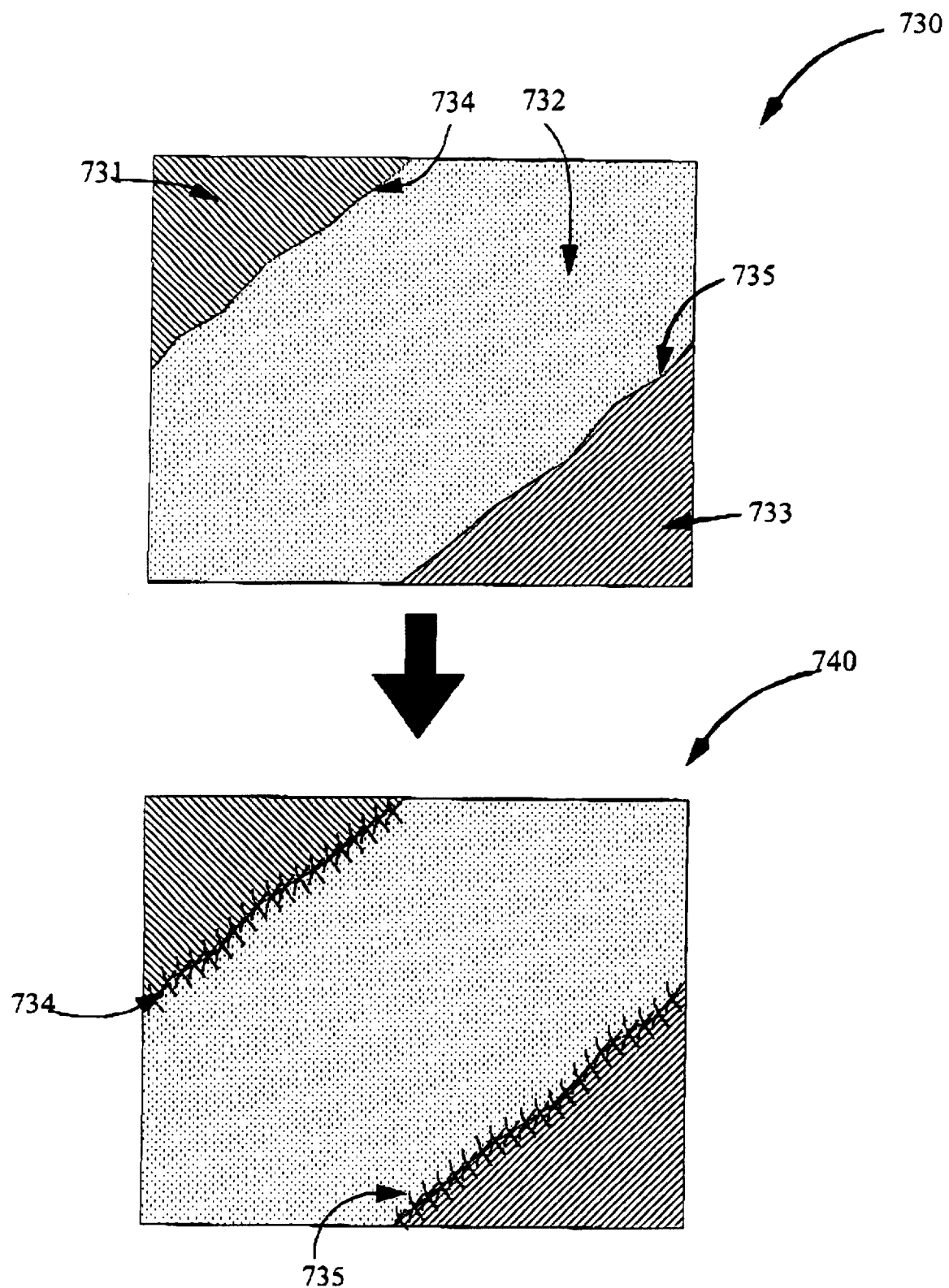
FIG. 7 illustrates a filtering of an example image to produce a water color effect.

Turning now to FIG. 7, there is illustrated an example of the filtering process. An initial image 730 will, after being divided into color regions, include various color regions e.g. 731, 732, and 733 of a continuous color. Further, spline edges 734, 735 will exist between the color regions. After a three-dimensional color space averaging filter is applied along the edges, the result will be as schematically illustrated in the second image 740. The image being substantially the same as image 730 however, the border spline regions 734, 735 contain a blended mixture of the two colors on opposite side of the border. This blended mixture will be substantially similar to that produced if a water color painting process were to be utilized in copying the original image.

Figure 9:
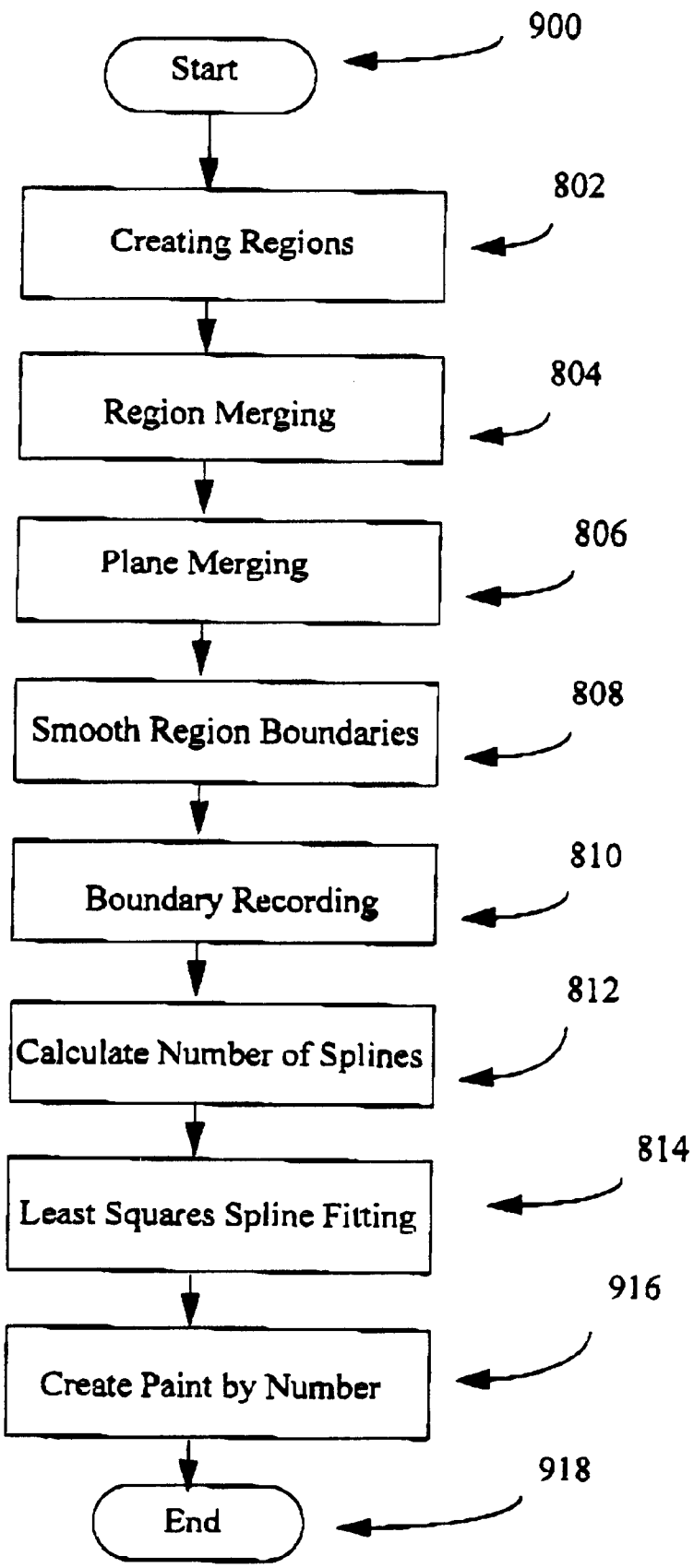
FIG. 9 illustrates a flow chart of a preferred method for automatically creating a paint by number image from an arbitrary image.

After completion of this step 816, the processing terminates at step 818 and the image can be output to a display device and/or printer.
Alternative Embodiment FIG. 9 illustrates a flow chart of a preferred method for automatically creating a paint by number image from an arbitrary pixel image.

Figure 6A:
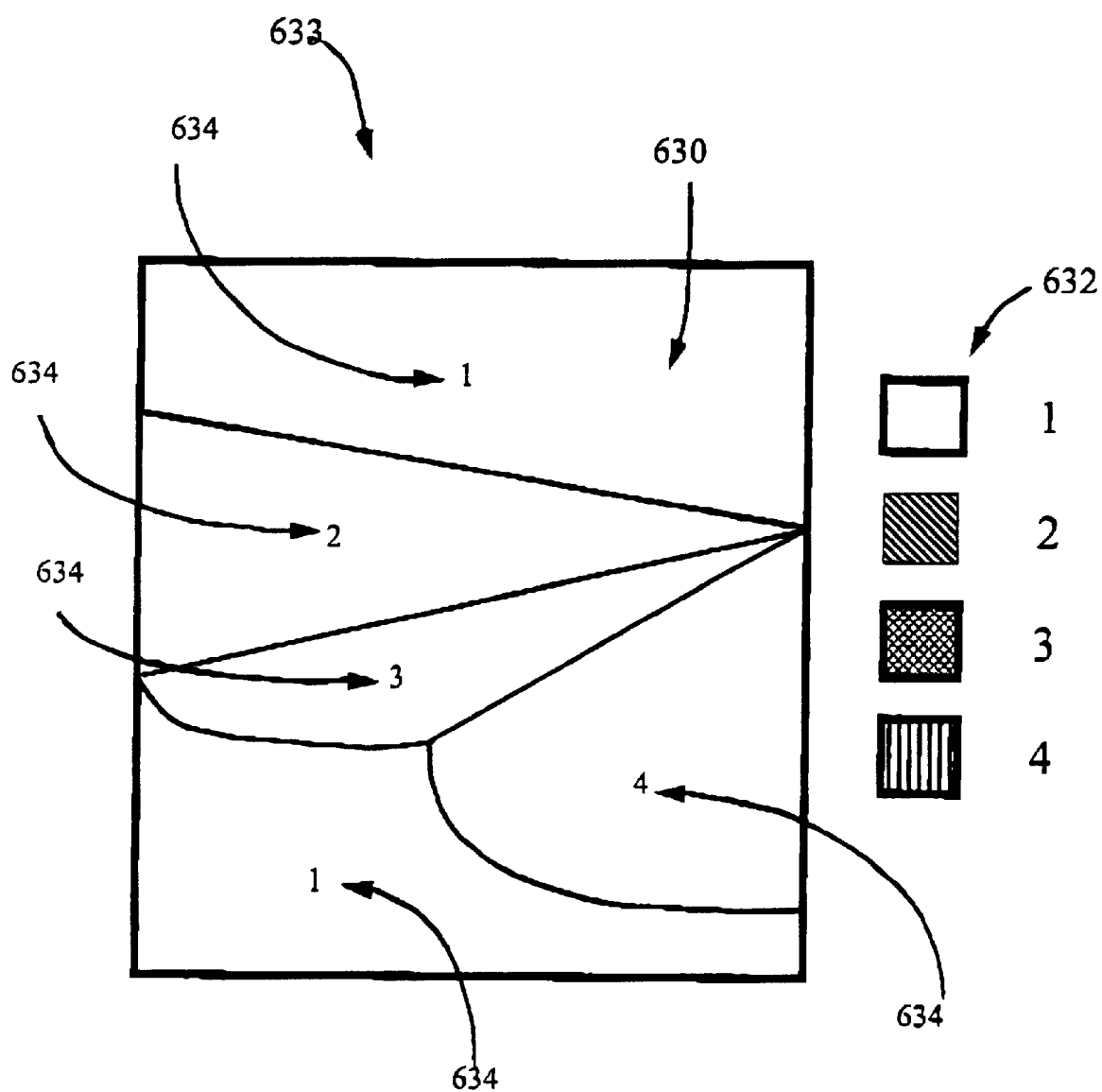
FIG. 6A illustrates an exemplary image produced using the method shown in FIG. 9.

In step 900, processing commences and an image is input and any necessary parameters initialized. After input, processing continues at step 802. The steps 802 to 814 (FIG. 9) of the alternative method are the same as that described above with reference to FIG. 8 and will not be described further. After the completion of step 814, the processing continues at step 916.
Step 916: Paint by Number In step 916, the splines are output along with associated color information as, for example, illustrated in FIG. 6A. The splines describing the picture divide the picture into region e.g. 630. For each region, a center of gravity measure can be calculated and a reference numeral 634 placed at the corresponding position of the center of gravity in a region.

Figure 6B:
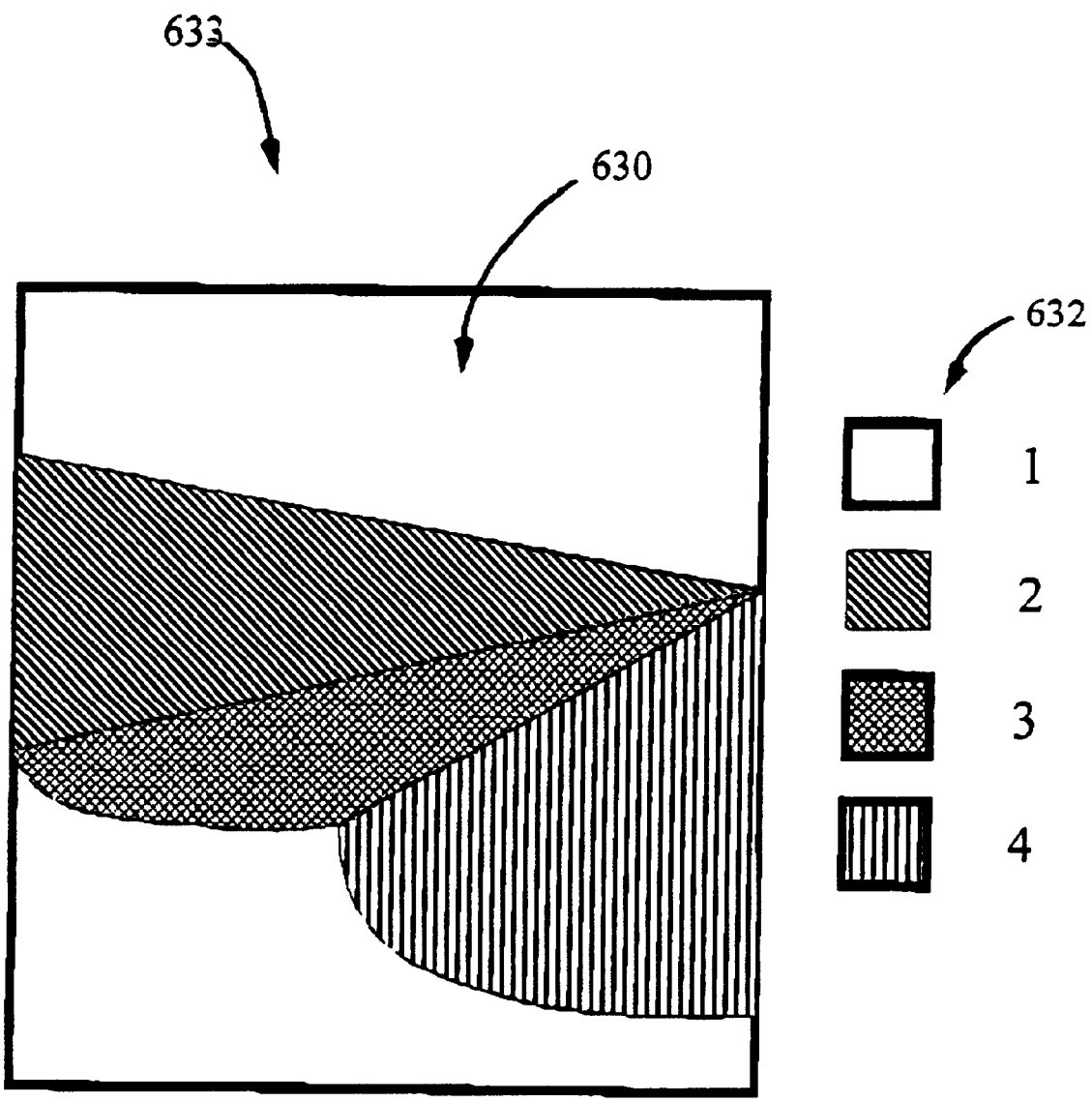
FIG. 6B illustrates a painted image of the image shown in FIG. 6A.

Alternatively, other schemes are possible, especially where a particular region is too small. For example, a numeral could be offset with an arrow pointing to the center of gravity of a particular region. Further, a color index, eg. 632 is preferably constructed alongside the image 633. The color index 632 having a predetermined number of colors associated with the particular image with each color index representing a unique color in the final image. The image and associated color index can then be output on a color output device so as to form a "paint-by-number" image of an arbitrary image. Such an output device can be a display and/or printer. A user can then paint, on the printed "paint-by-number" image, colors in the appropriate regions according to the color index. Such a completed "paint-by-number" image is shown in FIG. 6B. Alternatively, in the situation where the paint-by-number image is output to display, the user may paint on the "paint-by-number" image by way of a known graphics package. The preferred alternative method terminates at step 918.

Preferred Embodiment of Apparatus

Figure 10:
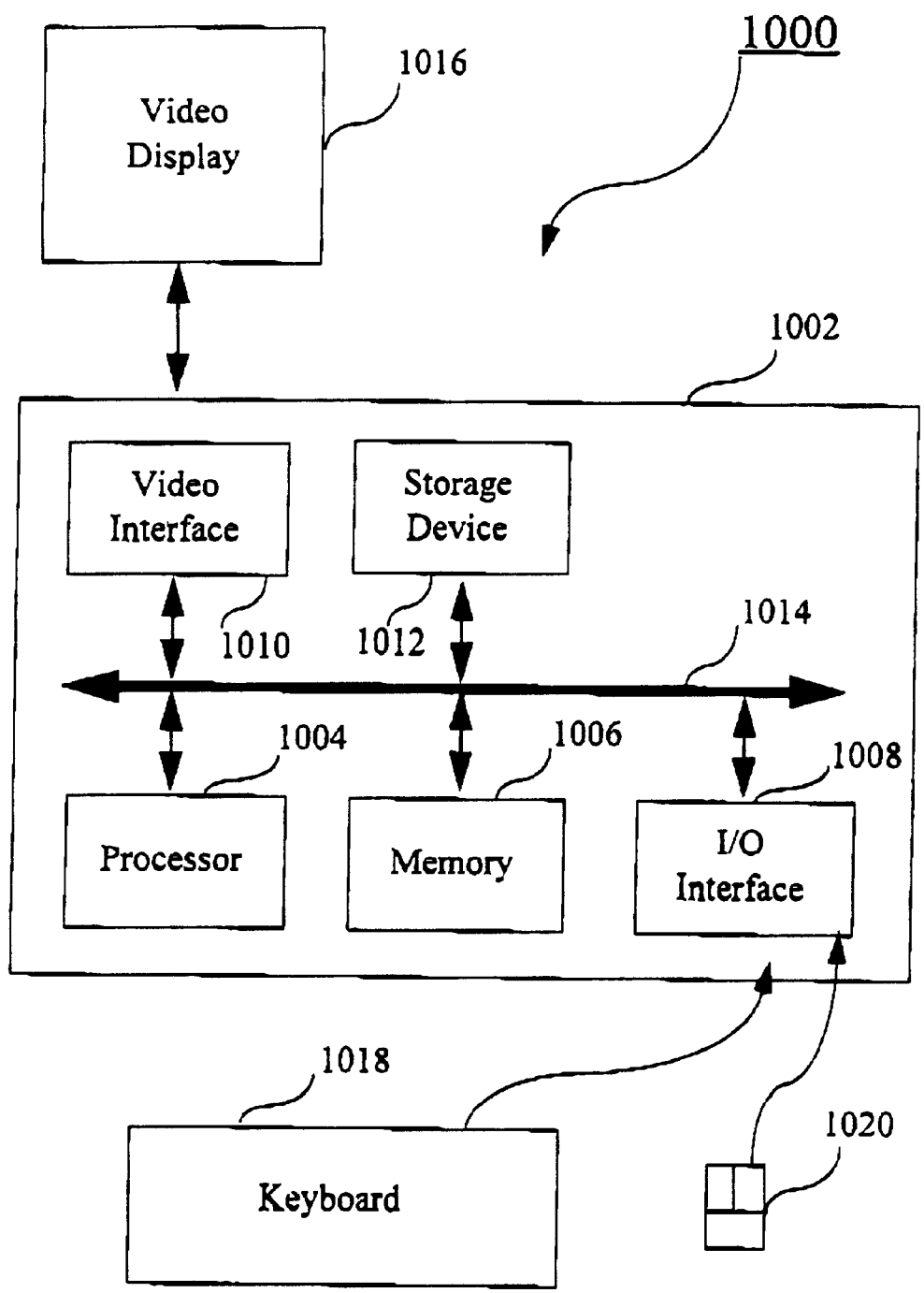
FIG. 10 is a block diagram of a general-purpose computer with which the embodiments can be implemented.

The method for transforming an image into a water color like image and the method for creating a paint by number image from an image are preferably practiced using a conventional general-purpose computer, such as the one shown in FIG. 10, wherein the processes of FIG. 8 or 9 may be implemented as separate software executing on the computer. In particular, the steps of the above mentioned preferred methods are effected by instructions in respective different software that are carried out by the computer. Each software may be divided into two separate parts; one part for carrying out the steps of the preferred method; and another part to manage the user interface between the latter and the user. The software may be stored in a computer readable medium, including the storage devices described below, for example. The respective software is capable of being loaded into the computer from the computer readable medium, and then executed by the computer. A computer readable medium having such software or computer program recorded on it is a computer program product.

The computer system 1000 consists of the computer 1002, a video display 1016, and input devices 1018, 1020. In addition, the computer system 1000 can have any of a number of other output devices including line printers, laser printers, plotters, and other reproduction devices connected to the computer 1002. The computer system 1000 can be connected to one or more other computers via a communication interface using an appropriate communication channel such as a modem communications path, a computer network, or the like. The computer network may include a local area network (LAN), a wide area network (WAN), an Intranet, and/or the Internet.

The computer 1002 itself consists of a central processing unit(s) (simply referred to as a processor hereinafter) 1004, a memory 1006 which may include random access memory (RAM) and read-only memory (ROM), input/output (IO) interfaces 1008, a video interface 1010, and one or more storage devices generally represented by a block 1012 in FIG. 10. The storage device(s) 1012 can consist of one or more of the following: a floppy disc, a hard disc drive, a magneto-optical disc drive, CD-ROM, magnetic tape or any other of a number of non-volatile storage devices well known to those skilled in the art. Each of the components 1004 to 1012 is typically connected to one or more of the other devices via a bus 1014 that in turn can consist of data, address, and control buses.

The video interface 1010 is connected to the video display 1016 and provides video signals from the computer 1002 for display on the video display 1016. User input to operate the computer 1002 can be provided by one or more input devices 1008. For example, an operator can use the keyboard 1018 and/or a pointing device such as the mouse 1020 to provide input to the computer 1002.

The system 1000 is simply provided for illustrative purposes and other configurations can be employed without departing from the scope and spirit of the invention. Exemplary computers on which the embodiment can be practiced include IBM-PC/ATs or compatibles, one of the Macintosh (TM) family of PCs, Sun Sparcstation (TM), or the like. The foregoing are merely exemplary of the types of computers with which the embodiments of the invention may be practiced. Typically, the processes of the embodiments, described hereinafter, are resident as software or a program recorded on a hard disk drive (generally depicted as block 1012 in FIG. 10) as the computer readable medium, and read and controlled using the processor 1004. Intermediate storage of the program and pixel data and any data fetched from the network may be accomplished using the semiconductor memory 1006, possibly in concert with the hard disk drive 1012.

In some instances, the program may be supplied to the user encoded on a CD-ROM or a floppy disk (both generally depicted by block 1012), or alternatively could be read by the user from the network via a modem device connected to the computer, for example. Still further, the software can also be loaded into the computer system 1000 from other computer readable medium including magnetic tape, a ROM or integrated circuit, a magneto-optical disk, a radio or infra-red transmission channel between the computer and another device, a computer readable card such as a PCMCIA card, and the Internet and Intranets including email transmissions and information recorded on websites and the like. The foregoing are merely exemplary of relevant computer readable mediums. Other computer readable mediums may be practiced without departing from the scope and spirit of the invention.

The above mentioned preferred methods may alternatively be implemented in dedicated hardware such as one or more integrated circuits performing the functions or sub functions of the steps of the preferred methods. Such dedicated hardware may include graphic processors, digital signal processors, or one or more microprocessors and associated memories.

The foregoing only describes a small number of embodiments of the present invention, however, modifications and/or changes can be made thereto by a person skilled in the art without departing from the scope and spirit of the invention.

We claim:

1. A method of automatically creating a paint by number image from an arbitrary image, said method comprising the steps of:

generating an image comprising regions each having an uniform color, wherein the regions of the generated image correspond locationwise to those respective regions of the arbitrary image having pixels with low variations in color and wherein the uniform color of each region of the generated image is representative of a determined color of the pixels of the corresponding region of the arbitrary image;

grouping the regions of the generated image which are closest in color into color planes of substantially uniform color so as to minimize the number of color planes below a predetermined number of planes; and determining borders of the regions and outputting the borders together with at least an index indicating the color plane of each region in the form of a color by number image having characteristics of the original arbitrary image.

2. A method according to claim 1, further comprising the step of smoothing the borders of the regions before grouping the regions into color planes.

3. A method as claimed in claim 1, wherein the determined color of the pixels of the corresponding region is an average of the colors of the corresponding region.

4. An apparatus for automatically creating a paint by number image from an arbitrary image, said apparatus comprising:

means for generating an image comprising regions each having an uniform color, wherein the regions of the generated image correspond locationwise to those respective regions of the arbitrary image having pixels with low variations in color and wherein the uniform color of each region of the generated image is representative of a determined color of the pixels of the corresponding region of the arbitrary image;

means for grouping the regions of the generated image which are closest in color into color planes of substantially uniform color so as to minimize the number of color planes below a predetermined number of planes; and means for determining borders of the regions and outputting the borders together with at least an index indicating the color plane of each region in the form of a color by number image having characteristics of the original arbitrary image.

5. An apparatus according to claim 4, further comprising means for smoothing the borders of the regions before grouping the regions into color planes.

6. Apparatus as claimed in claim 4, wherein the determined color of the pixels of the corresponding region is an average of the colors of the corresponding region.

7. A computer program product comprising a computer readable medium having recorded thereon a computer program for automatically creating a paint by number image from an arbitrary image, said computer program product comprising:

code for generating an image comprising regions each having an uniform color, wherein the regions of the generated image correspond locationwise to those respective regions of the arbitrary image having pixels with low variations in color and wherein the uniform color of each region of the generated image is representative of a determined color of the pixels of the corresponding region of the arbitrary image;

code for grouping the regions of the generated image which are closest in color into color planes of substantially uniform color so as to minimize the number of color planes below a predetermined number of planes; and code for determining borders of the regions and outputting the borders together with at least an index indicating the color plane of each region in the form of a color by number image having characteristics of the original arbitrary image.

8. A computer program product according to claim 7, further comprising code for smoothing the borders of the regions before grouping the regions into color planes.

9. A computer program product as claimed in claim 7, wherein the determined color of the pixels of the corresponding region is an average of the colors of the corresponding region.

* * * * *